H. BRIGGS.
GUIDE OR GAGE FOR HAND TOOLS.
APPLICATION FILED MAR. 11, 1919.
1,317,126.
Patented Sept. 23, 1919.
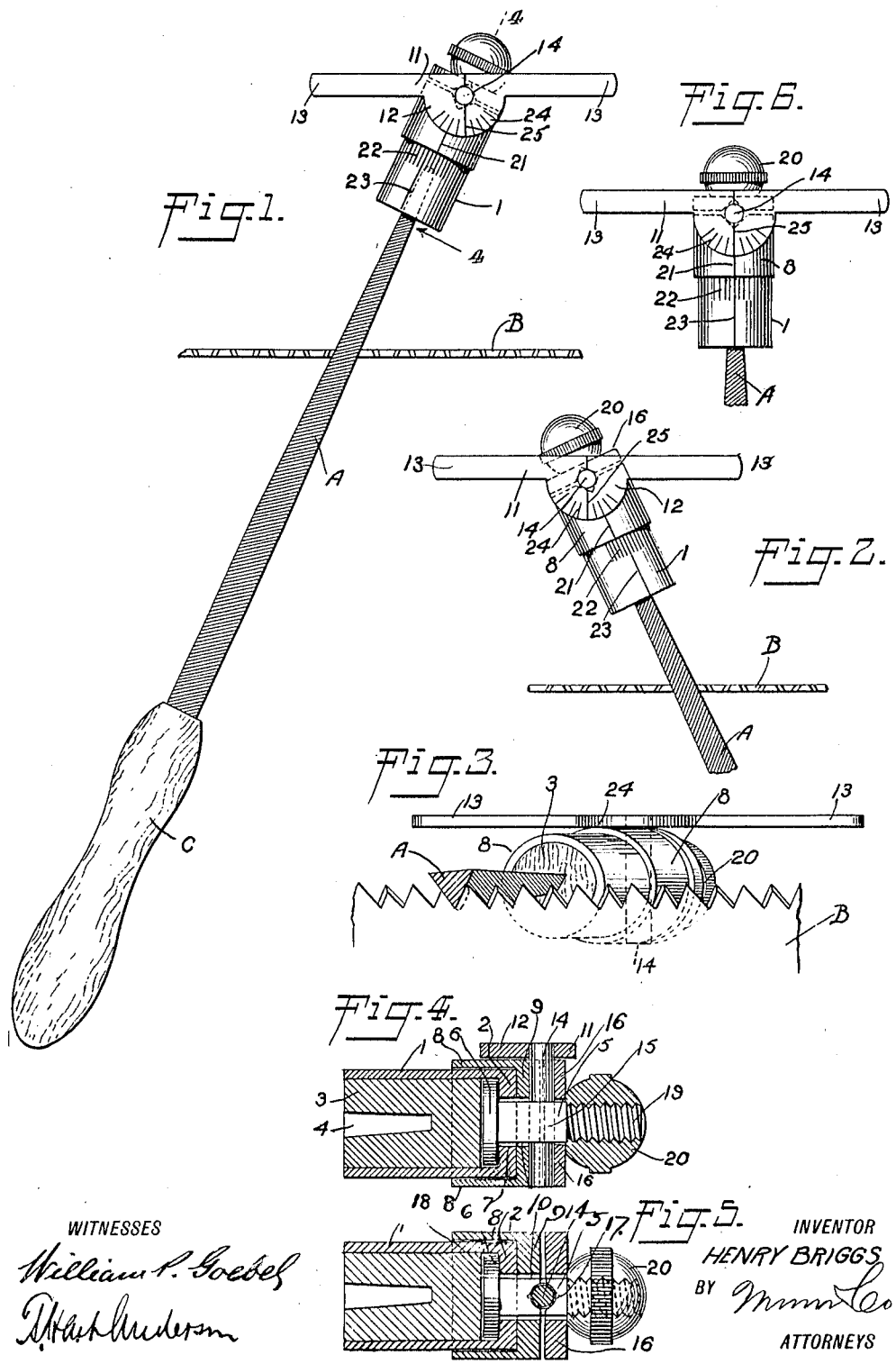
WITNESSES
INVENTOR
HENRY BRIGGS
BY
ATTORNEYS

UNITED STATES PATENT OFFICE.

HENRY BRIGGS, OF HASBROUCK HEIGHTS, NEW JERSEY.

GUIDE OR GAGE FOR HAND-TOOLS.

1,317,126.  Specification of Letters Patent.  Patented Sept. 23, 1919.

Application filed March 11, 1919. Serial No. 281,985.

*To all whom it may concern:*

Be it known that I, HENRY BRIGGS, a citizen of the United States, and a resident of Hasbrouck Heights, county of Bergen, and State of New Jersey, have invented certain new and useful Improvements in Guides or Gages for Hand-Tools, of which the following is a specification.

The present invention relates to a guide or gage for hand tools which, in operation, are reciprocated in straight lines extending longitudinally of the tool, such as files, saws, etc. More particularly, the invention relates to a guide or gage to be applied to a triangular file used for sharpening the teeth of saws, and the illustrated embodiment of the invention shows a guide or gage used in connection with such a file.

As is well known to those skilled in the art, saw teeth are provided with beveled edges, the edges of adjacent teeth being substantially the same and extending at the same angle with relation to the plane of the blade of the saw, and it is usual in sharpening saws, to form the opposite edges of the teeth on different angles or pitch with relation to a line passing perpendicularly through the blade of the saw in the plane of the blade, and usually, the beveled edges of adjacent teeth are sharpened simultaneously by means of a triangular file. The desired angular cutting edge or bevel is determined by the angular position of the line of reciprocation of the file with relation to the plane of the blade of the saw, and the pitch of the teeth is determined by the angular position of the operating surfaces of the file with relation to a horizontal line extending longitudinally along the base of the teeth.

The object of the present invention is to produce a guide or gage which, when applied to a triangular file, will indicate the desired angular position of the line of reciprocation of the file with relation to the plane of the blade of the saw.

A further object of the invention is to provide a guide or gage whereby the angular position of the line of reciprocation as above set forth, may be indicated, and also the position of its working faces, or the angular position thereof with relation to a longitudinal line passing through the base of the teeth may be indicated.

A further object of the invention is to provide such a guide or gage which may be conveniently used as a hand-hold in the operation of the tool to which it is applied.

To the above ends, the present invention consists of a guide or gage, means for connecting it to a reciprocating hand tool to extend transversely across the same, and means for adjusting the position of the guide or gage with relation to the longitudinal axis of the tool.

It further consists of a guide or gage, means for connecting it to a reciprocating hand tool to extend transversely across the same, and means whereby said gage may be angularly positioned with relation to the tool about separate and independent axes angularly disposed.

The invention further consists of the devices and combinations of devices which will be hereinafter described and claimed.

The invention is illustrated in the accompanying drawings in which—

Figure 1 illustrates the guide or gage in plan view attached to a triangular file and showing a section of saw teeth illustrating the operation of the device.

Fig. 2 is a similar view illustrating the guide or gage adjusted in a direction opposite to that shown in Fig. 1, a portion of the file and the handle being omitted in this figure.

Fig. 3 shows an enlarged view, the guide or gage being shown in perspective and with a portion of a file and the teeth of a saw illustrating the operation of the device.

Fig. 4 shows a vertical sectional view through the guide or gage taken on a line 4—4 in Fig. 1.

Fig. 5 shows a sectional view through the guide or gage on a line at right angles to the section shown in Fig. 4.

Fig. 6 shows a plan view with the parts at zero.

Similar reference characters will be used throughout the specification and drawings to designate corresponding parts.

The device comprises a body portion 1, which in the illustrated embodiment, is in the form of a metallic cylinder having a closed end 2. Within the open end of the cylinder is fitted a cylindrical block 3 in which is provided means, such as the socket 4, for connecting the body portion 1 to the tool. In the illustrated embodiment the device is intended to be used with a triangular file A and therefore the socket 4 is formed of triangular shape in cross section so that the end of the file A may be fitted therein and the device frictionally held thereon. The body portion 1 is swiveled upon a headed bolt 5, the head 6 of which engages the closed end 2 of the body portion 1, the shank passing through an opening 7 formed in the head 2. Fitting over the closed end of the body portion 1 is a short cylindrical sleeve 8 having a closed end 9 provided with a central opening 10 through which the shank of the bolt 5 passes. The guide or gage proper 11 comprises an enlarged semicircular center 12 carrying the diametrically extending arms 13. This guide or gage is fixedly secured to a post 14, which post passes through an opening 15 in the shank of the bolt 5 and is arranged to be engaged by a washer 16 also mounted on the shank of the bolt 5. The meeting faces of the washer 16 and the closed end of the sleeve 8 are provided with diametrically extending V shaped grooves 17 and 18 arranged to engage the post 14. The outer end of the shank of the bolt 5 is threaded as at 19 and receives a threaded nut 20.

The foregoing arrangement is such that the post 14 and its attached guide or gage and the sleeve 8 may be rotated relatively to the body portion 1, and having been moved to a desired relative position, held in such position by turning up the nut 20 to cause the shank 14, the sleeve 8 and the body portion 1 to be clamped together, thus holding the parts rigidly in adjusted position. Further, the post 14 may be turned in its bearing and thus dispose the radial arms 13 at any desired angular position with relation to the body portion 1 and the sleeve 8.

The socket 4 in the sleeve 8 is in axial alinement with the longtitudinal line of the bolt 5 and, as before stated, is triangular in cross section when intended for use with a triangular file, the apex of the triangle being underneath and the base at the top. Thus, when a file is inserted in the socket, one surface thereof will be uppermost and in a substantially horizontal position when the gage is set at zero, as shown in Fig. 6, at which time the radial arms 13 will extend at a right angle to the length of the file and in a plane substantially parallel with the upper surface of the file. As shown in Fig. 1, the device has been adjusted so that the file extends in one direction obliquely to the guide arms 13, and is also axially positioned so that the upper surface of the file or the base of the triangle will be in a plane at an angle to the plane of the guide arms 13. Fig. 2 shows an adjustment in the opposite direction, that is to say, with the file extending obliquely toward the right with relation to the guide arms 13 and axially adjusted, so that the file or the upper surface thereof is inclined in the opposite direction to the plane of the guide arms 13. In order to determine and accurately secure the proper adjustment, the sleeve 8 is provided with a zero mark or line 21 which is located upon the upper surface thereof, extending in a longitudinal direction, and on a line which will cut the longitudinal axis, and this zero line or mark 21 is arranged to coöperate with a scale 22 formed on the upper surface of the body portion 1 immediately adjacent the edge of the sleeve 8 and formed of parallel lines spaced equal distances apart and extending equal distances upon opposite sides of a zero line 23. The semi-circular central portion 12 of the gage or guide 11 is also provided with a scale 24 formed of radial lines spaced equal distances apart adjacent its outer curved edge and equally distributed upon opposite sides of a central or zero mark 25. If the zero marks 21, 23 and 25 are brought into alinement with each other, the socket 4 in the body portion 1 will then be located so as to position the inserted file A so that it will extend directly at right angles to the line of the guide arms 13, with the upper surface of the file in a horizontal plane and parallel to the plane of the guide arms 13. When thus positioned and fixed, the file is intended for operation in a plane at right angles to a line or plane extending longitudinally through and parallel to the work being operated upon. When adjusted as shown in Fig. 1, with the segmental scale 24 set two degrees to the right of the zero mark 21, and the scale 22 set two degrees to the left of the zero mark 21, the gage arms 13 when held parallel to the plane of the face of the saw B will cause the file to project at an angle thereto and the upper face of the file A will be tilted to the left about its longitudinal axis, providing in operation the arms 13 are held substantially parallel to a horizontal plane. In Fig. 2 the adjustment is just opposite to that described in Fig. 1.

In use, the device is adjusted so as to produce the proper angular relation of the file to the gage or guide, and in the operation of the file an effort is made to maintain the arms 13 in a position parallel to the face of the saw and in a horizontal plane.

It will of course, be understood that the position of the gage arms may be adjusted to cause a relative angular position of the file with relation thereto in an oblique direction without changing the axial adjustment of the file. It will also be understood that while I have described the invention as applicable to a file, it is equally applicable to any other hand operated reciprocating tool.

When used on a triangular file in sharpening saw teeth, the position of the file in its reciprocatory movements determines the degree of bevel given to the edges of the teeth and also the angular formation or pitch of the teeth, it being understood of course, that the opposite inclined surfaces of the file operate simultaneously on the adjacent edges of adjacent teeth, so that the angle of projection of the edges will correspond with the angular position of the sides of the file.

The device is connected to the end of the file in operation and forms a convenient handle to be grasped by the operator in addition to the handle C, and as before stated, in the operation of the file the arms 13 will be held at all times parallel to the face of the saw and in a horizontal position.

It is usual in operating files and sharpening saws, for the operator to grasp the handle with the right hand and the forward end of the file with the left, and the relative position of the file with relation to the saw is wholly determined by the judgment of the operator by the position of the end of the file between the thumb and finger of the left hand. The transversely extending guide arms will at all times convey to the operator by the sense of touch and consciousness, as well as vision, the desired position of the file with relation to the saw.

Having described my invention, I claim as new:—

1. A guide or gage for reciprocating hand tools, comprising a body portion, means to connect the body portion to the tool, guide arms pivotally mounted on such body portion and extending transversely thereto, and means to adjust the guide arm with relation to the longitudinal axis of the body portion.

2. A guide or gage for reciprocating hand tools, comprising a body portion having a socket in one end thereof, a guide arm, such guide arm and body portion being connected by a swivel located in axial alinement with the socket, and a nut engaging such swivel for locking the parts in adjusted position.

3. A guide or gage for reciprocating hand tools, comprising a body portion having a socket located in the end thereof and extending axially therein, a sleeve mounted on the end of the body portion to turn axially with relation thereto, a guide arm provided with a central post, a headed bolt connecting the body portion and the sleeve so that they may be axially turned with relation to each other, the post of the guide arm fitted in a bearing in the bolt and a washer and threaded nut for clamping the parts together, the body portion, sleeve and guide arm being provided with coöperating scales to indicate and determine their relative adjustments.

HENRY BRIGGS.

Copies of this patent may be obtained for five cents each, by addressing the "Commissioner of Patents, Washington, D. C."